Patented June 12, 1923.

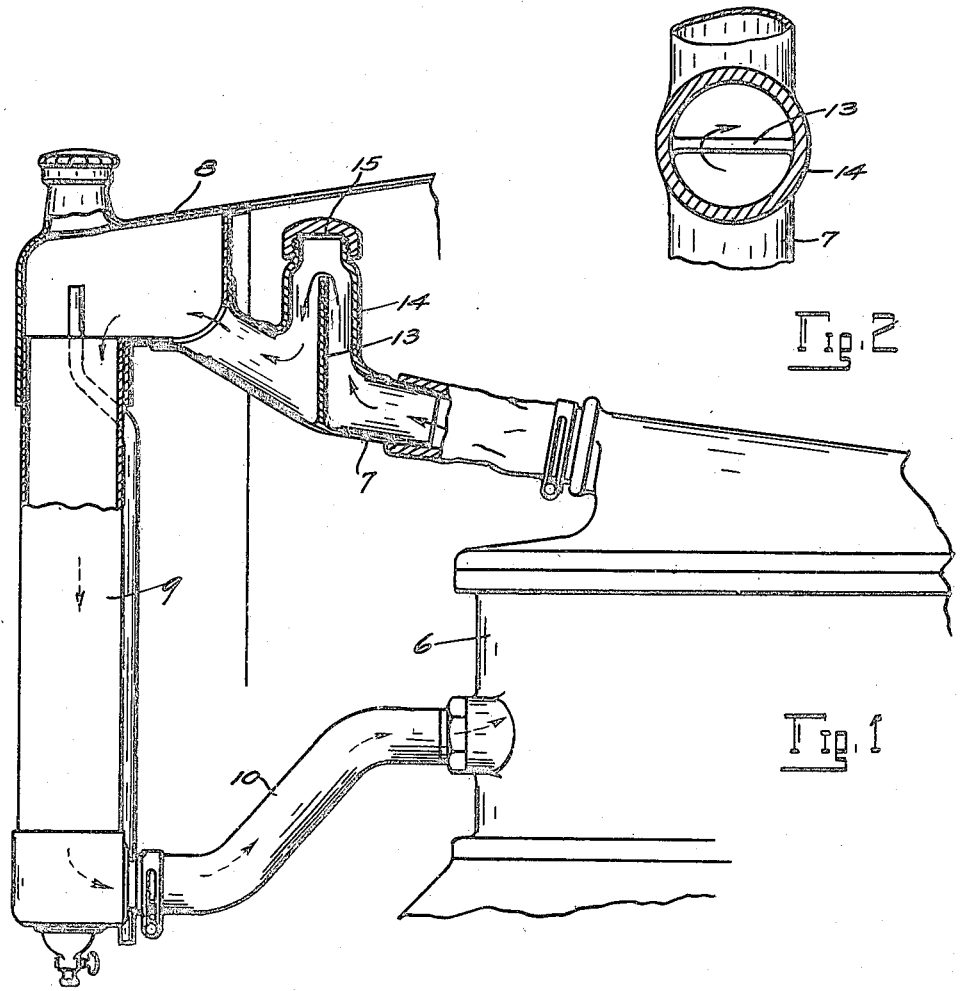
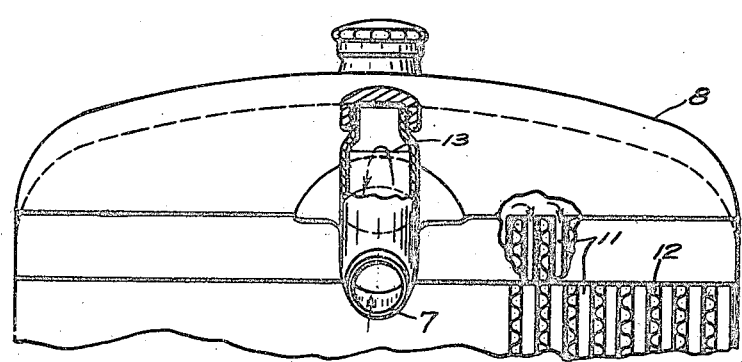

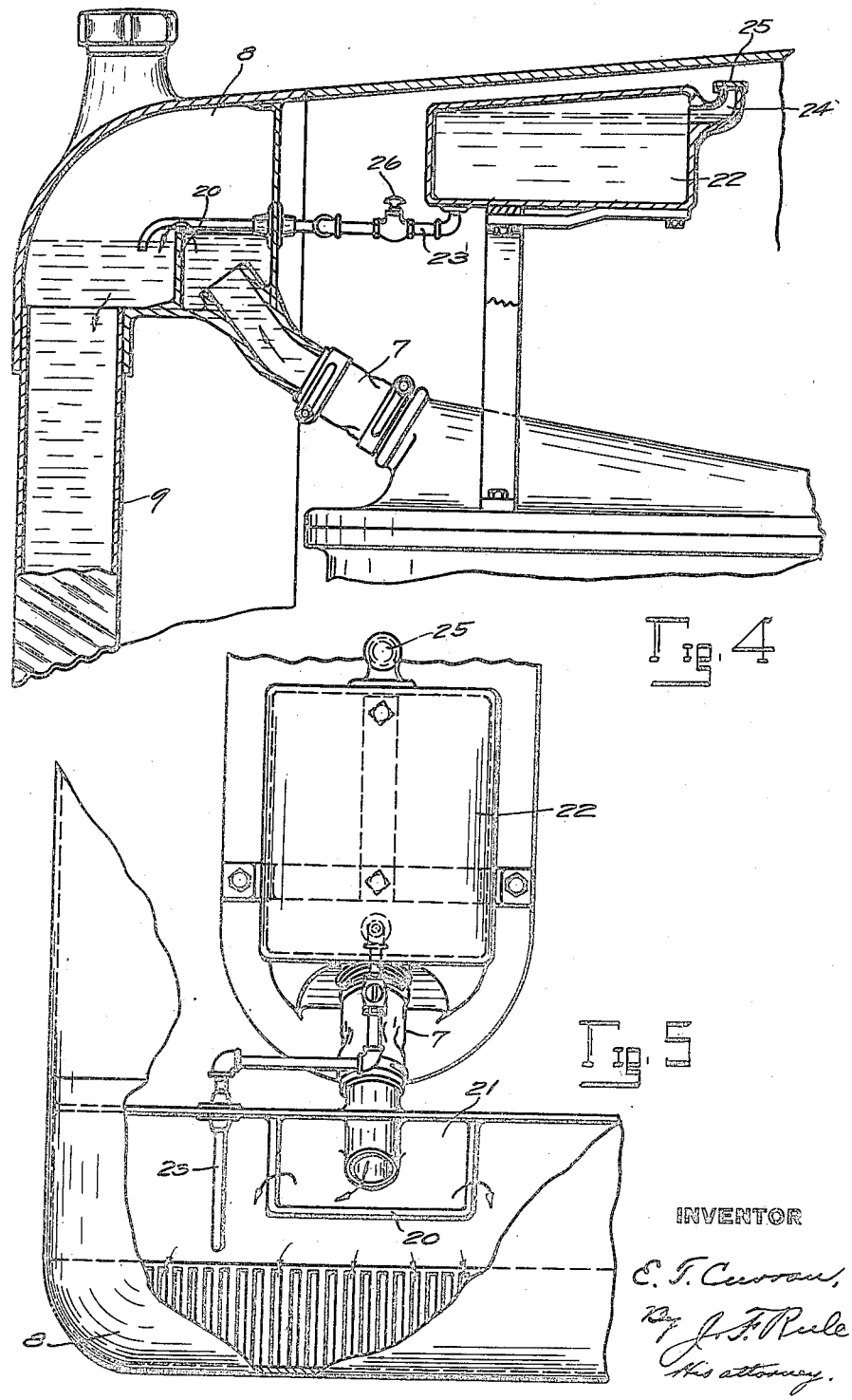

1,458,129

UNITED STATES PATENT OFFICE.

EDWARD T. CURRAN, OF DETROIT, MICHIGAN.

WATER-CIRCULATING SYSTEM.

Application filed October 29, 1919. Serial No. 334,191.

*To all whom it may concern:*

Be it known that I, EDWARD T. CURRAN, a citizen of the United States, residing at Detroit, in the county of Wayne and State of Michigan, have invented new and useful Improvements in Water-Circulating Systems, of which the following is a specification.

My invention relates to water circulating systems, which may include a heating appliance, as for example, an internal combustion engine, and a cooling radiator.

An object of the invention is to provide an improved thermostatic regulator by which the water is kept at a substantially constant temperature, and prevented from circulating while it is below a predetermined temperature. The invention is of particular value for use with water cooled internal combustion engines, as it provides a simple and practical means to prevent circulation of the cooling water until it is near the boiling point, and then maintains it at a constant high temperature. Cooling of the engine below an efficient working temperature is thus prevented.

In its preferred form the regulator comprises a partition wall or dam at any convenient point in the system between the heating appliance and the cooling appliance. This dam rises above the normal level of the water and prevents the water from passing until it nears the boiling point and is forced over the dam.

Other features of the invention will appear hereinafter.

In the accompanying drawings, Figure 1 is a part sectional elevation of a water cooling system for an internal combustion engine, showing the thermostatic regulator between the engine and the radiator tank. Figure 2 is a sectional plan of said regulator. Figure 3 is a rear view of the radiator and regulator, the latter being shown in section. Figure 4 is a view similar to Fig. 1, but showing the regulator within the tank, and also showing a reservoir from which water is automatically supplied to the circulation to maintain a constant level. Figure 5 is a plan view of the same.

Referring particularly to Figs. 1, 2 and 3, a heating appliance, here shown as a water cooled gas engine, has its water jacket 6 connected through a pipe or conduit 7 with a tank 8 over the radiator 9. The heated water from the engine circulates as indicated by the arrows through the pipe 7, tank and radiator, and is returned to the engine through a pipe 10. The radiator as here shown comprises a series of vertical flat tubes or conduits 11 extending downward from the tank, with interposed corrugated heat radiating plates 12. The particular construction of the radiator, however, forms no part of the present invention.

The thermostatic regulator as shown in Figs. 1 to 3 comprises a wall or septum 13 extending from the lower wall of the pipe 7 upward into a stand pipe 14 rising from the pipe 7. As this septum extends entirely across the channel, the water can only pass by rising over the top of the septum which is preferably a short distance above the normal level of the water. The upper end of the pipe 14 is closed by a screw threaded cap 15 which may be removed for introducing water.

The construction being as shown and above described, circulation of the water through the radiator is prevented by the obstructing wall 13, until the water is quite hot. As it nears the boiling point the expansion forces the water to rise and overflow the dam 13, thereby establishing a circulation. The rate of flow however, will be so restricted that the temperature of the water will not fall materially below that required to start the circulation, for as soon as the temperature commences to drop the water absorbs more of the heat from the engine and the pressure is reduced. In this manner the circulation is so regulated automatically that a substantially constant high temperatures is maintained. This is of special value with internal combustion engines which, as is well known, work better and more efficiently when hot. With the present invention there is dissipation of heat beyond that required to prevent overheating of the engine.

In Figs. 4 and 5, a wall 20 is located within the tank 8 and provides a compartment 21 into which the water flows from the pipe 7. The wall extends above the normal level of the water in the tank and operates in the same manner as the wall 13 of Fig. 1 to regulate the circulation.

In order to keep the water in the tank at a constant level, I provide an auxiliary tank or reservoir 22 above the level of the water in tank 8. A pipe 23 leads from this reservoir into the tank 8 and terminates at the normal level of the water in the tank 8. The reservoir may be filled with water through an intake pipe 24 provided with a removable cap 25. A valve 26 in the pipe 23 may be closed while the reservoir is being filled. The reservoir is air tight so that when the water in tank 8 covers the lower end of pipe 23, the atmospheric pressure prevents the water from running out of the reservoir. When the water level falls below the pipe 23, air is admitted through said pipe to the reservoir so that water is permitted to run into the tank 8 until it again seals the pipe 23. In this manner the circulating water is kept at a substantially constant level as long as there is a supply of water in the reservoir.

Although I have referred to water as the circulating liquid, any other suitable liquid might be used, the principle of operation being the same. Various modifications in the construction and arrangement of parts may be resorted to within the spirit and scope of my invention. Moreover, the scope of my invention is not limited to a cooling system for a gas engine, as the principles involved are applicable to various other circulating systems.

What I claim is:—

1. A circulating system comprising in combination, a heating appliance, a cooling appliance, means to conduct a liquid from one appliance to the other, and automatic means to prevent a flow of the liquid from the heating appliance to the cooling appliance until the liquid has reached a predetermined high temperature, said preventing means comprising a stationary obstruction in the path of the liquid arranged to permit a free flow of the liquid over the obstruction when the pressure of the liquid behind said obstruction rises.

2. In combination, a heater, a cooler, a conduit through which liquid is conveyed from the heater to the cooler, and a fixed obstruction within the conduit in the path of the liquid to automatically prevent a flow of liquid while the liquid is below a predetermined temperature, said obstruction arranged to permit the liquid to pass under the influence of liquid pressure developed behind the obstruction.

3. In combination, a heater, a cooler, a conduit through which liquid is conveyed from the heater to the cooler, and a fixed obstruction in the path of the liquid by which circulation is prevented while the temperature is low, said obstruction being arranged to permit the passage of the liquid under pressure generated by the heater.

4. A liquid circulating system comprising a conduit or channel through which the liquid flows, a septum in said conduit in the path of the liquid, projecting above the normal level of the liquid, and arranged to prevent its circulation until sufficient pressure is applied to the liquid to lift it over said septum.

5. A conduit through which liquid is caused to flow, a stand pipe rising from the conduit, and a septum extending across the conduit and stand-pipe and upward in the stand-pipe to a point above the normal level of the liquid.

6. The combination of a heating appliance, a radiator, a gravity system for circulating a liquid between said parts, comprising a conduit leading from the upper end of the heating appliance to the upper end of the radiator, a return pipe leading from the lower end of the radiator to the heating appliance, and a thermostatic regulator in said conduit comprising a dam projecting above the normal level of the liquid and preventing passage of the liquid until pressure has developed sufficient to lift the liquid over the dam, whereby circulation is prevented until the liquid has reached a predetermined high temperature.

7. The combination of a heating appliance, a cooling appliance, a gravity system for circulating a liquid between said appliances comprising pipes or conduits below the level of the liquid, and a thermostatic regulator in one of said conduits obstructing the flow and operable to prevent circulation before the liquid has reached a predetermined high temperature, and to so regulate the circulation that the liquid will be kept at substantially said temperature, said regulator comprising a stationary obstruction in the path of the liquid, over which the liquid is lifted by pressure of the liquid behind the obstruction.

8. The combination of an engine, a water cooling system therefor comprising a radiator and a reservoir above the radiator, a conduit through which the heated water is conducted from the engine to said reservoir, and an obstructing wall in said conduit projecting above the water level and by which the flow of water is prevented except under a propelling force sufficient to lift the water over said wall.

9. The combination with an engine, of a water cooling system comprising a radiator, a tank above the radiator, a conduit leading from the engine to the tank through which the heated water passes from the engine to the tank, a return pipe extending from the radiator to the engine, and a diaphragm in that part of said system through which the water passes from the engine to the tank, said diaphragm projecting above the normal water level and arranged to prevent circulation except when the water is forced over the top of the diaphragm.

EDWARD T. CURRAN.